(12) United States Patent
Hara

(10) Patent No.: US 8,796,378 B2
(45) Date of Patent: Aug. 5, 2014

(54) ELASTOMER COMPOSITION AND PNEUMATIC TIRE USING SAME

(75) Inventor: Yuichi Hara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 450 days.

(21) Appl. No.: 12/997,769

(22) PCT Filed: Jun. 9, 2009

(86) PCT No.: PCT/JP2009/060821
§ 371 (c)(1),
(2), (4) Date: Dec. 13, 2010

(87) PCT Pub. No.: WO2009/154155
PCT Pub. Date: Dec. 23, 2009

(65) Prior Publication Data
US 2011/0094650 A1    Apr. 28, 2011

(30) Foreign Application Priority Data
Jun. 17, 2008    (JP) .................................. 2008-158165

(51) Int. Cl.
*C08L 23/22*    (2006.01)
(52) U.S. Cl.
USPC .......................... 524/519; 524/169; 152/537
(58) Field of Classification Search
CPC ..... C08L 23/22; C08L 23/28; C08L 2666/20; C08L 2205/02; C08L 2312/00; C08L 2666/02; C08L 51/06; C08L 77/02; C08L 77/06; B60C 1/0008; C08K 3/22
USPC ............ 264/171; 428/216, 316, 317; 152/510
See application file for complete search history.

(56) References Cited

U.S. PATENT DOCUMENTS

| | | | |
|---|---|---|---|
| 6,397,912 B1 | 6/2002 | Watanabe et al. | |
| 6,617,383 B2 | 9/2003 | Ikawa et al. | |
| 7,179,857 B2 | 2/2007 | Enjalbert et al. | |
| 2008/0275187 A1* | 11/2008 | Tsou et al. | 525/178 |

FOREIGN PATENT DOCUMENTS

| | | |
|---|---|---|
| CN | 1471855 A | 2/2004 |
| JP | 64-006043 A | 1/1989 |
| JP | 03265662 A | 11/1991 |
| JP | 2000-103917 A | 4/2000 |
| JP | 2001-512167 T | 8/2001 |
| JP | 2002-080644 A | 3/2002 |
| JP | 2002-523539 A | 7/2002 |
| JP | 2003-165871 A | 6/2003 |
| JP | 2006-514140 A | 4/2006 |
| WO | WO-99/06480 A1 | 2/1999 |
| WO | WO-02/32993 | 4/2002 |
| WO | WO-0248257 A2 | 6/2002 |
| WO | WO-2004-081099 A1 | 9/2004 |
| WO | WO-2007-050071 A1 | 5/2007 |
| WO | WO-2007/055802 A1 | 5/2007 |
| WO | WO2007/081323 * | 7/2007 |
| WO | WO-2008/060302 | 5/2008 |

OTHER PUBLICATIONS

Supplemental Extended European Search Report issued in related European Application No. 09766603.6 dated May 9, 2011.

* cited by examiner

*Primary Examiner* — Liam J Heincer
*Assistant Examiner* — Marilou Lacap
(74) *Attorney, Agent, or Firm* — Novak Druce Connolly Bove + Quigg LLP

(57) ABSTRACT

An elastomer composition comprising a butyl-based rubber (A), as a dispersed phase, including (i) a brominated isobutylene and p-methylstyrene copolymer rubber or (ii) a blend of a butyl rubber, halogenated butyl rubber and/or polyisobutylene rubber and a brominated isobutylene and p-methylstyrene copolymer rubber and a Nylon resin (B), as a matrix phase, selected from Nylon 11, Nylon 6/66 copolymer, Nylon 6 and/or Nylon 66, wherein the matrix phase of the butyl-based rubber/Nylon resin blend composition having titanium oxide (C) compounded therein in an amount of 2.5 to 8% by weight, based upon the weight of the Nylon resin (B), whereby UV degradation can be suppressed and long term outdoor exposure can be withstood and a pneumatic tire using the same.

20 Claims, No Drawings

ELASTOMER COMPOSITION AND PNEUMATIC TIRE USING SAME

CROSS REFERENCE TO RELATED APPLICATIONS

This application is a National Phase filing under 35 U.S.C. §371 of PCT/JP2009/060821 filed on Jun. 9, 2009; and this application claims priority to Application No. 2008-158165 filed in Japan on Jun. 17, 2008 under 35 U.S.C. §119; the entire contents of all are hereby incorporated by reference.

TECHNICAL FIELD

The present invention relates to an elastomer composition and a pneumatic tire using the same, more specifically, it relates to an elastomer composition suppressed in UV degradation and a pneumatic tire using the same, for example, as an inner liner.

BACKGROUND ART

An elastomer composition obtained by blending a butyl-based rubber and Nylon is well known. However, a butyl-based rubber has a low resistance to UV light. If exposed to sunlight, there was a problem of degradation and a significant drop in mechanical properties. As a method for preventing UV degradation, compounding of an amine or phenol-based antioxidizing agent thereto has been the general practice (see PLT 1 below), but these react with the rubber or Nylon and have a detrimental effect on the blend of the rubber and Nylon, and therefore, in the butyl-based rubber/Nylon blends system, there were limits to use and a sufficient effect of prevention of UV degradation could not be obtained. Further, if carbon black is compound into the rubber, it is known in the art that the resistance is given to UV degradation (see PLT 2 below), but in rubber/Nylon blends system, there is the problem that the carbon black in the rubber acts as defects which cause a drop in durability, and therefore, there are limits to the compounding amounts thereof. These also could not give sufficient effects of prevention of UV degradation.

CITATION LIST

Patent Literature

PLT 1: Japanese Patent Publication (A) No. 2000
PLT 2: Japanese Patent Publication (A) 2001-512167

SUMMARY OF INVENTION

Technical Problem

Accordingly, an object of the present invention is to suppress UV degradation of the above elastomer composition comprising a blend of a butyl-based rubber and Nylon resin and to provide an elastomer composition capable of withstanding long term exposure outdoors and a pneumatic tire using the same.

Solution to Problem

In accordance with the present invention, there is provided an elastomer composition comprising a butyl-based rubber (A) as a dispersed phase, including, (i) a brominated isobutylene and p-methylstyrene copolymer rubber or (ii) a blend of at least one rubber selected from a butyl rubber, halogenated butyl rubber and polyisobutylene rubber and a brominated isobutylene and p-methylstyrene copolymer rubber and a Nylon resin (B), as a matrix phase, selected from at least one member of Nylon 11, Nylon 6/66 copolymer, Nylon 6 and Nylon 66, or any blend thereof, wherein the matrix phase of the butyl-based rubber/Nylon resin blend composition having titanium oxide (C) compounded therein in an amount of 2.5 to 8% by weight, based upon the weight of the Nylon resin (B).

In accordance with the present invention, there is further provided a pneumatic tire using the above elastomer composition as an inner liner.

Advantageous Effects of Invention

According to the present invention, even when using an elastomer composition comprising a blend of a butyl-based rubber (A)/Nylon resin (B) as the inner liner of a tire, even when exhibiting the tire outdoors for a long time at a retail store or other outlet, UV degradation of the rubber can be prevented, and therefore, utilization becomes possible without causing the drop in the properties. Further, for convenience in tire manufacture, in some cases a release agent containing carbon black is coated on the inside surface of the tire. In this case, due to the presence of the release agent on the surface of the inner liner of the pneumatic tire, UV degradation of the rubber is prevented to a certain extent, but according to the present invention, even without using a release agent containing carbon black, UV degradation can be suppressed, and therefore, it is possible to impart stable properties to the pneumatic tire, as an inner liner.

DESCRIPTION OF EMBODIMENTS

The singular forms ("a", "an", "the") used in the Description and the attached Claims should be understood as including the plural case except when otherwise clear from the context.

The present inventors engaged in research to solve the above problems and, as a result, found that the above object can be achieved by an elastomer composition comprising a butyl-based rubber (A), as a dispersed phase, including (i) a brominated isobutylene and p-methylstyrene copolymer rubber or (ii) a blend of at least one rubber selected from a butyl rubber, halogenated butyl rubber and polyisobutylene rubber and a brominated isobutylene and p-methylstyrene copolymer rubber and a Nylon resin (B), as a matrix phase, selected from at least one type of or any blend of Nylon 11, Nylon 6/66 copolymer, Nylon 6 and Nylon 66, or any blend thereof, wherein the matrix phase of the butyl-based rubber/Nylon resin blend composition having titanium oxide (C) compounded therein in an amount of 2.5 to 8% by weight, based upon the weight of the Nylon resin (B).

According to the present invention, by introducing, into the matrix Nylon resin (B), titanium oxide (i.e., titanium dioxide, the same below) in 2.5 to 8% by weight, it is possible to suppress the passage of UV light to the UV susceptible butyl-based rubber (A) and to prevent the degradation by irradiation of UV light, without causing the drop in the durability. Titanium oxide is generally used as a white coloring agent in an amount, based upon the weight of the resin, of 0.5 to 1.5% by weight or so, but even if colored, if the amount of use of titanium oxide is low, a UV blocking effect cannot be obtained, while if too large, defects are formed and the durability is lowered, and therefore, the amount blended is, based upon the resin weight, 2.5 to 8% by weight, preferably 3.5 to 6.5% by weight.

In the elastomer composition of the present invention, as the titanium oxide used as the ingredient (C), the anatase type and the rutile type are well known, but for blocking UV light, use of the rutile type titanium oxide is preferred.

As the butyl-based rubber (A) forming the dispersed phase in the elastomer composition of the present invention, (i) a brominated isobutylene and p-methylstyrene copolymer rubber or (ii) a blend of at least one rubber selected from a butyl rubber, halogenated butyl rubber and polyisobutylene rubber with a brominated isobutylene and p-methylstyrene copolymer rubber may be mentioned. These can all be easily obtained, as commercially available products. Among these, use of a brominated isobutylene and p-methylstyrene copolymer rubber is preferable from the viewpoints of the compatibility with Nylon and the heat resistance.

As the Nylon resin (B) forming the matrix phase in the elastomer composition of the present invention, at least one type of, or any blend of, Nylon 11, Nylon 6/66 copolymer, Nylon 6 and Nylon 66 may be mentioned. These also can all be easily obtained, as commercially available products. Among these, use of a Nylon 6/66 copolymer and a blend of the same with Nylon 6 is preferable from the viewpoint of the balance of the gas barrier property and fatigue durability. The compounding ratio of the butyl-based rubber (A) and the Nylon resin (B) is not particularly limited, but the ratio (by weight) of the rubber (A)/resin (B) is preferably, from the viewpoint of the fatigue durability, 55/45 to 95/5. The ratio of 60/40 to 85/15 is more preferable.

The Nylon resin (B) forming the matrix phase of the elastomer composition of the present invention preferably contain a general plasticizer for Nylon resin (D), for example, ethyltoluene sulfonamide, cyclohexyltoluene sulfonamide, butylbenzene sulfonamide and other sulfonamide-based compounds, or p-oxybenzoic acid octyl esters, dimethyl phthalate, triphenyl phosphate, glycerin, hexylglycol, etc., compounded therein. As a particularly preferable plasticizer (D), use of butylbenzene sulfonamide is preferable from the viewpoint of the compatibility. The amount of the plasticizer (D) compounded is not particularly limited, but 10 to 40% by weight, based upon the weight of the Nylon resin (B) is preferable and 20 to 35% by weight is more preferable.

The elastomer composition of the present invention preferably contains, as a compatibilizer for the butyl-based rubber (A) forming the dispersed phase and the Nylon resin (B) forming the matrix phase, a modified polyolefin (E) at the time of mixing the butyl-based rubber (A) and the Nylon resin (B). As the modified polyolefin, for example, a maleic anhydride-modified ethylene-ethyl acrylate copolymer or a maleic anhydride-modified products of an ethylene-propylene copolymer, ethylene-butene copolymer, ethylene-hexene copolymer or ethylene-octene copolymer may be mentioned. The amount of the modified polyolefin (E) compounded is not particularly limited, but from the viewpoints of the gas barrier property and the fatigue durability, 1 to 15% by weight based upon the weight of the butyl-based rubber (A) is preferable and 5 to 12% by weight is more preferable.

In the present invention, the cross-linking agent (F) is preferably compounded during the mixing of the butyl-based rubber (A) and Nylon resin (B) forming the elastomer composition of the present invention so as to cause the butyl-based rubber (A) to dynamically cross-link. In particular, it is preferable to first mix the cross-linking agent (F) and the butyl-based rubber (A) to obtain a rubber composition, then mixed with the Nylon resin (B) to cause the butyl-based rubber (A) to dynamically cross-link, whereby an elastomer composition is produced. Here, "dynamically cross-link" means to mix the resin and the rubber well and, in the state continuing the mixing, to add the cross-linking agent to cross-link the rubber. More specifically, it is possible to mix the butyl-based rubber (A) and the Nylon resin (B) in, for example, a twin-screw kneader or other suitable kneader in the presence of the cross-linking agent under conditions of at least the temperature where the polyamide melts, preferably 230 to 280° C., and a total mixing time of 30 seconds to 5 minutes or so to thereby obtain the targeted dynamic cross-linking. Furthermore, the shear rate at the time of kneading (or mixing) is preferably 500 to 7500 $sec^{-1}$.

As the cross-linking agent (F) usable in a preferred embodiment of the present invention, for example, zinc oxide, magnesium oxide, methylol phenol, etc. may be mentioned. These are known commercially available compounds and can be easily obtained by persons skilled in the art.

The elastomer composition according to the present invention may have compounded thereinto, in addition to the above ingredients, carbon black, silica or another filler, a vulcanizing or cross-linking agent, a vulcanizing or cross-linking accelerator, various types of oils, an antioxidant, a plasticizer and other various types of additives generally compounded, for tire use and other rubber composition use. These additives can be mixed by a general method to obtain a composition which is then used for vulcanization or cross-linking. The amounts of these compounding additives may be made the conventional general compounding amounts so long as not running counter to the object of the present invention. Further, the method of using the elastomer composition of the present invention to produce, for example, the inner liner of a pneumatic tire may also be based on the conventional methods.

EXAMPLES

The present invention will now be further explained by the Examples, but the scope of the present invention is by no means limited to these Examples. Note that the evaluation tests were conducted as follows.

Test for Evaluation of Durability

Eight JIS No. 3 dumbbell shaped test pieces were punched out from a 1 mm thick sheet and repeatedly subjected to strain at a constant strain tester (made by Ueshima Seisakusho) at a strain of 40%, −20° C., 6.7 Hz for a maximum of 10 million cycles. The numbers of times of breakage of the dumbbells after the test were plotted by a Weibull distribution. The number of times of breakage giving a 70% breakage rate was calculated as the fatigue life.

The initial durability was determined by running the test and measuring the fatigue life as is after sheet formation, while the durability after the SW test was determined by using a sunshine weather meter (made by Suga Test Instruments, using carbon arc light source) to run a test at 63° C. with 12 minutes rain every 60 minutes for 168 hours, the running a constant strain test and measuring the fatigue life. A fatigue life of 1,000,000 cycles or more as judged as "OK" and those less than 1,000,000 cycles was judged as "NG (i.e., no good)".

Examples 1 to 9

Method of Preparation of Material

According to the formulations shown in Table I, each of Examples 6 to 8 was prepared by mixing the rubber (A) and cross-linking agent (F) in a Banbury mixer (made by Kobe Steel Corporation) at 100° C. for 2 minutes, and the other Examples were prepared processing the rubber (A) by a rubber pelletizer (made by Moriyama Seisakusho) at 100° C. into pellets and spreading the cross-linking agent (F). Next, a twin-screw kneader (TEX44, the Japan Steel Works) was used in an initial kneading zone to knead the resin (B), the titanium oxide master batch and the plasticizer (D). In the next kneading zone, rubber (A) on which the cross-linking agent (F) was spread and the modified polyolefin (E) were added, kneaded and extruded into strands, which were then cut into pellets by a strand cutter. The kneading temperature was 230° C. in Examples 1 to 2 and 4 to 9 and 290° C. in Example 3. The prepared pellets were processed by a T-die shaping machine at 210° C. in Examples 1 to 2 and 4 to 9 and at 280° C. in Example 3 to 1 mm thick sheets.

The evaluation results of the sheets thus obtained are shown in Table I.

Comparative Examples 1 to 9

Method of Preparation of Material

According to the formulations shown in Table II, each of Comparative Examples 1 to 3 was prepared by mixing the rubber (A), carbon black and a cross-linking agent (F) in a Banbury mixer (made by Kobe Steel Corporation) at 100° C. for 2 minutes. The other Comparative Examples were prepared by processing the rubber (A) by a rubber pelletizer (made by Moriyama Seisakusho) at 100° C. into pellets and spreading the cross-linking agent (F). Next, a twin-screw kneader (TEX 44, the Japan Steel Works) was used in an initial kneading zone to knead the resin (B) and the plasticizer (D). In the next kneading zone, rubber (A) on which the cross-linking agent (F) was spread, the modified polyolefin

TABLE I

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Formulation (parts by weight) |  |  |  |  |  |  |  |  |  |  |
| Rubber (A) | Br-IPMS | 100 | 100 | 100 | 100 | 100 | 80 | 90 | 70 | 100 |
|  | Br-IIR | — | — | — | — | — | 20 | — | — | — |
|  | IIR | — | — | — | — | — | — | 10 | — | — |
|  | PIB | — | — | — | — | — | — | — | 30 | — |
| Cross-linking agent (F) | Zinc white | 0.5 | 0.5 | 0.5 | 0.15 | — | 0.5 | 0.5 | 0.5 | 0.5 |
|  | Stearic acid | 2 | 2 | 2 | 0.60 | — | 2 | 2 | 2 | 2 |
|  | Zinc stearate | 1 | 1 | 1 | 0.30 | — | 1 | 1 | 1 | 1 |
| Resin (B) | Nylon 11 | 75 | 65 | — | 36 | 36 | 36 | 36 | 36 | 36 |
|  | Nylon 6, 66 | — | — | — | 24 | 24 | 24 | 24 | 24 | 24 |
|  | Nylon 66 | — | — | 57 | — | — | — | — | — | — |
| Titanium oxide master batch (C) |  | 10 | 10 | 10 | 10 | 10 | 10 | 10 | 10 | 5 |
| Plasticizer (D) | BBSA | — | 10 | 27 | 10 | 10 | 10 | 10 | 10 | — |
| Modified polyolefin (E) | Mah-EEA | — | — | 10 | — | — | 10 | 10 | 10 | — |
| Total |  | 188.50 | 188.50 | 197.50 | 181.05 | 180.00 | 193.50 | 193.50 | 193.50 | 168.50 |
| Titanium oxide ratio [wt %] |  | 4.7 | 5.3 | 6.0 | 5.7 | 5.7 | 5.7 | 5.7 | 5.7 | 3.1 |
| Plasticizer ratio [wt %] |  | 0 | 12.3 | 30 | 13.2 | 13.2 | 13.2 | 13.2 | 13.2 | 0 |
| Modified polyolefin ratio [wt %] |  | 0 | 0 | 9.1 | 0 | 0 | 9.1 | 9.1 | 9.1 | 0 |
| Initial durability ($\times 10^4$ cycles) |  | 300 | 580 | 280 | 650 | 520 | 360 | 400 | 420 | 480 |
| Durability after SW test ($\times 10^4$ cycles) |  | 210 | 320 | 200 | 330 | 240 | 190 | 220 | 240 | 180 |

Notes to Table I
*1: Br-IPMS; Exxpro MDX89-4 (Exxon Mobile Chemicals)
*2: Br-IIR; Bromobutyl X2 (Bayer)
*3: IIR; Exxon Butyl268 (Exxon Mobil Chemicals)
*4: PIB; Oppanol B100 (BASF)
*5: Zinc white; Zinc White #3 (Seido Chemical)
*6: Stearic acid; Beads Stearate (NOF)
*7: Nylon 6, 66; UBE Nylon 5033B (Ube Industries)
*8: Nylon 6; UBE Nylon 1030B (Ube Industries)
*9: Nylon 11; Rilsan BESNOTL (ARKEMA)
*10: Nylon 66; UBE Nylon 2026B (Ube Industries)
*11: Titanium oxide master batch PAM (F) (Dainichiseika) 25529 White Nylon 6/titanium oxide = 60/40 wt %
*12: BBSA; BM-4 (Daihachi Chemical Industry)
*13: Carbon black; MA600 (Mitsubishi Chemical)
*14: 6PPD; SANTFLEX 6PPD (FLEXSYS)
*15: HALS; Tinuvin 622LD (Ciba Specialty Chemicals)
*16: UVA; Tinuvin 234 (Ciba Specialty Chemicals)
*17: Mah-EEA; HPR AR201 (Mitsui-DuPont Polychemical)
*18: Mah-EPM; Tuffmer MP0620 (Mitsui Chemical)
*19: Mah-EO; Exxcelor VA1840 (Exxon Mobil Chemicals)
*20: Calcium carbonate: Heavy Calcium (Maruo Calcium) Carbonate (E) and an antioxidant were added, kneaded at 230° C., and extruded into strands which were then cut into pellets by a strand cutter. The prepared pellets were processed by a T-die shaping machine at 210° C. to 1 mm thick sheets.

The evaluation results of the sheets thus obtained are shown in Table II.

by a rubber pelletizer (made by Moriyama Seisakusho) at 100° C. into a pellet shaped rubber composition. Next, a twin-screw kneader (TEX44, the Japan Steel Works) was used to first knead the resin (B), the titanium oxide master batch and the plasticizer (D) at 230° C. to obtain a resin composition, which was then extruded into strands and cut

TABLE II

|  |  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|---|
| Formulation (parts by weight) | | | | | | | | | | |
| Rubber (A) | Br-IPMS | 100 | 100 | 100 | 100 | 100 | 100 | 100 | 100 | 100 |
| Carbon black |  | 3 | 6 | 10 | — | — | — | — | — | — |
| Cross-linking agent (F) | Zinc white | 0.5 | 0.5 | 0.5 | 0.5 | 0.5 | 0.5 | 0.5 | 0.5 | 0.5 |
|  | Stearic acid | 2 | 2 | 2 | 2 | 2 | 2 | 2 | 2 | 2 |
|  | Zinc stearate | 1 | 1 | 1 | 1 | 1 | 1 | 1 | 1 | 1 |
| Resin (B) | Nylon 11 | 36 | 36 | 36 | 36 | 36 | 36 | 36 | 36 | 36 |
|  | Nylon 6, 66 | 24 | 24 | 24 | 24 | 24 | 24 | 24 | 24 | 24 |
| Antioxidant | 6PPD | — | — | — | 1 | 3 | 5 | — | — | 1 |
|  | HALS | — | — | — | — | — | — | 1 | — | 1 |
|  | UVA | — | — | — | — | — | — | — | 1 | 1 |
| Plasticizer (D) | BBSA | — | 10 | 10 | 10 | 10 | 10 | 10 | 10 | — |
| Total |  | 176.50 | 179.50 | 183.50 | 174.50 | 176.50 | 178.50 | 174.50 | 174.50 | 166.50 |
| Titanium oxide ratio [wt %] |  | 0 | 0 | 0 | 0 | 0 | 0 | 0 | 0 | 0 |
| Plasticizer ratio [wt %] |  | 14.3 | 14.3 | 14.3 | 14.3 | 14.3 | 14.3 | 14.3 | 14.3 | 14.3 |
| Modified polyolefin ratio [wt %] |  | 0 | 0 | 0 | 0 | 0 | 0 | 0 | 0 | 0 |
| Initial durability ($\times 10^4$ cycles) |  | 580 | 460 | 80 | 620 | 670 | Scorch 30 | 660 | 640 | 640 |
| Durability after SW test ($\times 10^4$ cycles) |  | 15 | 40 | 60 | 10 | 70 | 25 | 8 | 7 | 10 |

Examples 10 to 25 and Comparative Examples 10 to 11

Method of Preparation of Material

According to each of the formulations shown in Table III and Table IV, the rubber (A) and a cross-linking agent (F) were mixed in a Banbury mixer (made by Kobe Steel Corporation) at 100° C. for 2 minutes, then the result was processed into pellets. Next, the rubber composition, resin composition and modified polyolefin were kneaded by the above-mentioned twin-screw kneader at 230° C., extruded into strands, and cut into pellets. The prepared pellets were processed by a T-die shaping machine at 230° C. to 1 mm thick sheets.

The evaluation results of the obtained sheets are shown in Table III and Table IV.

TABLE III

|  |  | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Formulation (parts by weight) | | | | | | | | | | |
| Rubber (A) | Br-IPMS | 100 | 100 | 100 | 100 | 100 | 100 | 100 | 100 | 100 |
| Cross-linking agent (F) | Zinc white | 0.15 | 0.15 | 0.15 | 0.15 | 0.15 | 0.15 | 0.15 | 0.15 | 0.15 |
|  | Stearic acid | 0.60 | 0.60 | 0.60 | 0.60 | 0.60 | 0.60 | 0.60 | 0.60 | 0.60 |
|  | Zinc stearate | 0.30 | 0.30 | 0.30 | 0.30 | 0.30 | 0.30 | 0.30 | 0.30 | 0.30 |
| Resin (B) | Nylon 6, 66 | 57 | 44 | 66 | 60 | 55 | — | 57 | 57 | 57 |
|  | Nylon 6 | — | 13 | — | — | — | 57 | — | — | — |
| Titanium oxide master batch (C) |  | 10 | 10 | 10 | 5 | 13 | 10 | 10 | 10 | 10 |
| Plasticizer (D) | BBSA | 27 | 27 | 18 | 27 | 27 | 27 | 27 | 27 | 27 |
| Modified polyolefin (E) | Mah-EEA | 10 | 10 | 10 | 10 | 10 | — | — | 3 | 6 |
|  | Mah-EPM | — | — | — | — | — | — | 10 | — | — |
|  | Mah-EO | — | — | — | — | — | 10 | — | — | — |
| Total |  | 205.05 | 205.05 | 205.05 | 203.05 | 206.05 | 205.05 | 205.05 | 198.05 | 201.05 |
| Titanium oxide ratio [wt %] |  | 6.0 | 6.0 | 6.0 | 3.1 | 7.6 | 6.0 | 6.0 | 6.0 | 6.0 |
| Plasticizer ratio [wt %] |  | 30 | 30 | 20 | 30 | 30 | 30 | 30 | 30 | 30 |
| Modified polyolefin ratio [wt %] |  | 9.1 | 9.1 | 9.1 | 9.1 | 9.1 | 9.1 | 9.1 | 2.9 | 5.7 |
| Initial durability ($\times 10^4$ cycles) |  | 1000 | 910 | 720 | 1000 | 830 | 780 | 940 | 890 | 950 |
| Durability after SW test ($\times 10^4$ cycles) |  | 620 | 520 | 390 | 350 | 580 | 460 | 540 | 540 | 570 |

TABLE IV

|  |  | Ex. 19 | Ex. 20 | Ex. 21 | Ex. 22 | Ex. 23 | Ex. 24 | Ex. 25 | Comp. Ex. 10 | Comp. Ex. 11 |
|---|---|---|---|---|---|---|---|---|---|---|
| Formula (parts weight) | | | | | | | | | | |
| Rubber (A) | Br-IPMS | 100 | 100 | 100 | 100 | 90 | 90 | 80 | 100 | 100 |
| | Br-IIR | — | — | — | — | 10 | — | — | — | — |
| | IIR | — | — | — | — | — | 10 | — | — | — |
| | PIB | — | — | — | — | — | — | 20 | — | — |
| Cross-linking agent (F) | Zinc white | 0.15 | 0.15 | 0.15 | 0.15 | 0.5 | 0.5 | 0.5 | 0.15 | 0.15 |
| | Stearic acid | 0.60 | 0.60 | 0.60 | 0.60 | 2 | 2 | 2 | 0.60 | 0.60 |
| | Zinc stearate | 0.30 | 0.30 | 0.30 | 0.30 | 1 | 1 | 1 | 0.30 | 0.30 |
| Resin (B) | Nylon 6, 66 | 57 | 44 | 54 | 50 | 57 | 57 | 57 | 61 | 53 |
| | Nylon 6 | — | 13 | 3 | 13 | — | — | — | — | — |
| Titanium oxide master batch (C) | | 10 | 10 | 10 | 10 | 10 | 10 | 10 | 3 | 17 |
| Plasticizer (D) | BBSA | 27 | 27 | 27 | 21 | 27 | 27 | 27 | 27 | 27 |
| Modified polyolefin (E) | Mah-EEA | 12 | — | — | — | 10 | 10 | 10 | 10 | 10 |
| | Mah-EPM | — | — | 6 | — | — | — | — | — | — |
| | Mah-EO | — | — | — | 10 | — | — | — | — | — |
| Total | | 207.05 | 210.05 | 201.05 | 205.05 | 207.50 | 207.50 | 207.50 | 202.05 | 214.05 |
| Titanium oxide ratio [wt %] | | 6.0 | 6.0 | 6.0 | 5.5 | 6.0 | 6.0 | 6.0 | 1.9 | 9.7 |
| Plasticizer ratio [wt %] | | 30 | 30 | 30 | 23 | 30 | 30 | 30 | 30 | 30 |
| Modified polyolefin ratio [wt %] | | 11 | 13 | 5.7 | 9.1 | 9.1 | 9.1 | 9.1 | 9.1 | 9.1 |
| Initial durability (×10$^4$ cycles) | | 1000 | 930 | 940 | 880 | 590 | 650 | 720 | 1000 | 35 |
| Durability after SW test (×10$^4$ cycles) | | 610 | 550 | 550 | 480 | 330 | 350 | 420 | 30 | 30 |

Comparative Examples 12 to 22

Method of Preparation of Material

According to each of the formulations shown in Table V, the rubber (A), carbon black and the cross-linking agent (F) were mixed in a Banbury mixer (made by Kobe Steel Corporation) at 100° C. for 2 minutes, then the result was processed by a rubber pelletizer (made by Moriyama Seisakusho) at 100° C. into a pellet shaped rubber composition. Next, a twin-screw kneader (TEX44, the Japan Steel Works) was used to first knead the resin (B) and the plasticizer (D) at 230° C. to obtain a resin composition, which was then extruded into strands and cut into pellets. Next, the rubber composition, resin composition, modified polyolefin and an antioxidant were kneaded by the twin-screw kneader at 230° C., extruded into strands, and cut into pellets. The prepared pellets were processed by a T-die shaping machine at 230° C. to 1 mm thick sheets.

The evaluation results of the obtained sheets are shown in Table V.

TABLE V

|  |  | Comp. Ex. 12 | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 |
|---|---|---|---|---|---|---|---|---|---|---|---|---|
| Formulation (parts by weight) | | | | | | | | | | | | |
| Rubber (A) | Br-IPMS | 100 | 100 | 100 | 100 | 100 | 100 | 100 | 100 | 100 | 100 | 100 |
| Carbon black | | — | 5 | 15 | — | — | — | — | — | 3 | — | — |
| Calcium carbonate | | — | — | — | — | — | — | — | — | — | — | 10 |
| Cross-linking agent (F) | Zinc white | 0.15 | 0.15 | 0.15 | 0.15 | 0.15 | 0.15 | 0.15 | 0.15 | 0.15 | 10 | 0.15 |
| | Stearic acid | 0.60 | 0.60 | 0.60 | 0.60 | 0.60 | 0.60 | 0.60 | 0.60 | 0.60 | 0.60 | 0.60 |
| | Zinc stearate | 0.30 | 0.30 | 0.30 | 0.30 | 0.30 | 0.30 | 0.30 | 0.30 | 0.30 | 0.30 | 0.30 |
| Resin (B) | Nylon 6, 66 | 63 | 63 | 63 | 63 | 63 | 63 | 63 | 63 | 63 | 63 | 63 |
| Antioxidant | 6PPD | — | — | — | 1 | 5 | — | — | — | 1 | — | — |
| | HALS | — | — | — | — | — | 1 | 10 | — | 0.5 | — | — |
| | UVA | — | — | — | — | — | 1 | — | 10 | 0.5 | — | — |
| Plasticizer (D) | BBSA | 27 | 27 | 27 | 27 | 27 | 27 | 27 | 27 | 27 | 27 | 27 |
| Modified polyolefin (E) | Mah-EEA | 10 | 10 | 10 | 10 | 10 | 10 | 10 | 10 | 10 | 10 | 10 |
| Total | | 201.05 | 206.05 | 216.05 | 202.05 | 206.05 | 203.05 | 211.05 | 211.05 | 206.05 | 210.9 | 211.05 |
| Titanium oxide ratio [wt %] | | 0 | 0 | 0 | 0 | 0 | 0 | 0 | 0 | 0 | 0 | 0 |
| Plasticizer ratio [wt %] | | 30 | 30 | 30 | 30 | 30 | 30 | 30 | 30 | 30 | 30 | 30 |
| Modified polyolefin ratio [wt %] | | 9.1 | 9.1 | 9.1 | 9.1 | 9.1 | 9.1 | 9.1 | 9.1 | 9.1 | 9.1 | 9.1 |
| Initial durability (×10$^4$ cycles) | | 1000 | 820 | 70 | 920 | Scorch, kneading not possible | 890 | 30 | 18 | 720 | 890 | 620 |
| Durability after SW test (×10$^4$ cycles) | | 1 | 28 | 50 | 12 | | 3 | 1 | 0.5 | 60 | 0.1 | 0.1 |

Tire Evaluation Test

The pellets of each of the elastomer compositions prepared by the above methods were extruded by inflation molding at 230° C. into 15-inch cylindrical shapes. Each extruded cylinder was cut in the circumferential to prepare an inner liner member for a tire. This member was used to prepare a 195/65R15 tire by vulcanization at 180° C. for 10 minutes.

Using 195/65R15 tires (rim 15×6JJ) each of the test tires was mounted on rim size 15×6JJ rims, then was run on at an air pressure of 140 kPa, a −20° C. atmosphere and a 6.1 kN load on a 1707 mm diameter drum at a speed of 80 km/h for up to a maximum running distance of 1500 km, then the inner liner surfaces were observed. "New product" indicates a tire tested as produced, while "After 6 months outdoor exposure" indicates a tire tested after being allowed to stand outdoors exposed to sufficient sunlight for 6 months.

The judgment was performed by remove a tire from the rim after the test and examining its inside surface. A tire with a size of a single crack on the inner liner of 10 mm or less and with a total number of cracks of within 10 was judged as "OK", while a tire with a size or number over the above values was judged as "NG (no good)". The results are shown in Table VI to Table VIII.

TABLE VI (Results of Tire Evaluation: 195/65R15-20° C.)

|  | Ex. 4 | Ex 9 | Ex. 10 | Ex. 11 | Ex. 12 | Ex. 13 | Ex. 14 | Ex. 17 |
|---|---|---|---|---|---|---|---|---|
| New product | 2 mm or less × 3 | 5 mm or less × 2 | No cracks | 1 mm × 1 | 2 mm or less × 3 | No cracks | 1 mm × 2 | 1 mm × 2 |
| After 6 months outdoor exposure | 5 mm or less × 3 | 8 mm or less × 5 | No cracks | 1 mm × 1 | 5 mm or less × 3 | 5 mm or less × 5 | 1 mm × 2 | 1 mm × 2 |
| Judgment | OK | OK | OK | OK | OK | OK | OK | OK |

TABLE VII (Results of Tire Evaluation: 195/65R15-20° C.)

|  | Ex. 18 | Ex. 19 | Ex. 20 | Comp. Ex. 2 | Comp. Ex. 5 | Comp. Ex. 10 | Comp. Ex. 11 | Comp. Ex. 13 |
|---|---|---|---|---|---|---|---|---|
| New product | 1 mm × 1 | No cracks | 1 mm × 1 | 5 mm or less × 3 | 2 mm or less × 3 | No cracks | 5 mm or less, many | 1 mm × 2 |
| After 6 months outdoor exposure | 1 mm × 1 | No cracks | 1 mm × 1 | 5 mm or less, many cracks | 5 mm or less, many cracks | 50 mm or less, many cracks | 20 mm or less, 15 cracks | 5 mm or less, many cracks |
| Judgment | OK | OK | OK | NG | NG | NG | NG | NG |

TABLE VIII (Results of Tire Evaluation: 195/65R15-20° C.)

|  | Comp. Ex. 15 | Comp. Ex. 20 |
|---|---|---|
| New product | 1 mm × 1 | 2 mm or less × 3 |
| After 6 months outdoor exposure | 50 mm or less, many cracks | 10 mm or less, 20 cracks |
| Judgment | No good | No good |

INDUSTRIAL APPLICABILITY

According to the present invention, even when using an elastomer composition comprising a blend of a butyl-based rubber (A)/Nylon resin (B) as the inner liner of a tire, even when exhibiting the tire outdoors for a long time at a retail store or other outlet, UV degradation of the rubber can be prevented, and therefore, utilization becomes possible without causing the drop in the properties. Further, for convenience in tire manufacture, in some cases a release agent containing carbon black is coated on the inside surface of the tire. In this case, due to the presence of the release agent on the surface of the inner liner of the pneumatic tire, UV degradation of the rubber is prevented to a certain extent, but according to the present invention, even without using a release agent containing carbon black, UV degradation can be suppressed, and therefore, it is possible to impart stable properties to the pneumatic tire as an inner liner.

The invention claimed is:

1. An elastomer composition comprising a butyl-based rubber (A), as a dispersed phase, including (i) a brominated isobutylene and p-methylstyrene copolymer rubber or (ii) a blend of at least one rubber selected from a butyl rubber, halogenated butyl rubber and polyisobutylene rubber and a brominated isobutylene and p-methylstyrene copolymer rubber and a Nylon resin (B), as a matrix phase, at least one member selected from Nylon 11, Nylon 6/66 copolymer, Nylon 6 and Nylon 66, and any blend thereof, wherein the matrix phase of the butyl-based rubber/Nylon resin blend composition has titanium oxide (C) compounded therein in an amount of 2.5 to 8% by weight, based upon the weight of the Nylon resin (B), wherein said titanium oxide (C) is first mixed with the Nylon resin (B), followed by being mixed with the butyl-based rubber, whereby the titanium oxide (C) is compounded in the matrix phase of the Nylon resin (B) in the elastomer composition.

2. The elastomer composition as claimed in claim 1, wherein said butyl-based rubber (A) is a brominated isobutylene and p-methylstyrene copolymer rubber.

3. The elastomer composition as claimed in claim 1, wherein said Nylon resin (B) is a Nylon 6/66 copolymer.

4. The elastomer composition as claimed in claim 1, wherein said Nylon resin (B) is a blend of a Nylon 6/66 copolymer and Nylon 6.

5. The elastomer composition as claimed in claim 1, wherein a plasticizer (D) for said Nylon resin (B) is compounded in the matrix phase of the Nylon resin (B) in the elastomer composition.

6. The elastomer composition as claimed in claim 5, wherein said plasticizer (D) is compounded in an amount of 10 to 40% by weight, based upon the weight of the Nylon resin (B).

7. The elastomer composition as claimed in claim 5, wherein said plasticizer (D) is compounded in an amount of 20 to 35% by weight, based upon the weight of the Nylon resin (B).

8. The elastomer composition as claimed in claim 5, wherein said plasticizer (D) is butylbenzene sulfonamide.

9. The elastomer composition as claimed in claim 1, wherein a modified polyolefin (E) is compounded, as a compatibilizer of the butyl-based rubber (A) and Nylon resin (B), when kneading the butyl-based rubber (A) and Nylon resin (B).

10. The elastomer composition as claimed in claim 9, wherein said modified polyolefin (E) is compounded in an amount of 1 to 15% by weight, based upon the weight of the butyl-based rubber (A).

11. The elastomer composition as claimed in claim 9, wherein said modified polyolefin (E) is compounded in an amount of 5 to 12% by weight, based upon the weight of the butyl-based rubber (A).

12. The elastomer composition as claimed in claim 9, wherein said modified polyolefin (E) is a maleic anhydride-modified ethylene-ethyl acrylate copolymer.

13. The elastomer composition as claimed in claim 9, wherein said modified polyolefin (E) is a maleic anhydride-modified product of an ethylene-propylene copolymer, ethylene-butene copolymer, ethylene-hexene copolymer or ethylene-octene copolymer.

14. The elastomer composition as claimed in claim 1, wherein a cross-linking agent (F) is compounded to dynamically cross-link the butyl-based rubber (A), while mixing the butyl-based rubber (A) and the Nylon resin (B).

15. The elastomer composition as claimed in claim 14, wherein the cross-linking agent (F) and the butyl-based rubber (A) are first mixed together to form a rubber composition, then the Nylon resin (B) containing the titanium oxide (C) compounded therein is mixed to dynamically cross-link the butyl-based rubber (A).

16. A pneumatic tire using an elastomer composition according to claim 1, as an inner liner.

17. The elastomer composition as claimed in claim 2, wherein said Nylon resin (B) is a Nylon 6/66 copolymer.

18. The elastomer composition as claimed in claim 2, wherein said Nylon resin (B) is a blend of a Nylon 6/66 copolymer and Nylon 6.

19. The elastomer composition as claimed in claim 2, wherein a plasticizer (D) for said Nylon resin (B) is compounded.

20. The elastomer composition as claimed in claim 3, wherein a plasticizer (D) for said Nylon resin (B) is compounded.

* * * * *